United States Patent
Bhalerao et al.

(10) Patent No.: US 9,420,003 B2
(45) Date of Patent: Aug. 16, 2016

(54) DYNAMIC COMMUNICATION BETWEEN SECURE ENDPOINTS

(71) Applicant: Cisco Technology, Inc., San Jose, CA (US)

(72) Inventors: Pranav Bhalerao, Bangalore (IN); Sunil Nr, Bangalore (IN); Chandra Balaji, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 13/925,226

(22) Filed: Jun. 24, 2013

(65) Prior Publication Data
US 2014/0380460 A1 Dec. 25, 2014

(51) Int. Cl.
*H04L 29/06* (2006.01)
*H04L 12/46* (2006.01)

(52) U.S. Cl.
CPC .............. *H04L 63/20* (2013.01); *H04L 12/4633* (2013.01); *H04L 63/0272* (2013.01); *H04L 63/164* (2013.01)

(58) Field of Classification Search
CPC ............ H04L 63/0272; H04L 12/4633; H04L 2212/0025; H04L 63/20; H04L 63/164
See application file for complete search history.

(56) References Cited

U.S. PATENT DOCUMENTS

| | | | |
|---|---|---|---|
| 7,447,901 B1 * | 11/2008 | Sullenberger et al. | 713/153 |
| 7,848,335 B1 * | 12/2010 | Kang | H04L 12/4633 370/401 |
| 8,059,641 B1 * | 11/2011 | Rai | 370/389 |
| 8,341,410 B2 * | 12/2012 | Shao et al. | 713/171 |
| 8,346,961 B2 | 1/2013 | Asati et al. | |
| 8,769,661 B2 * | 7/2014 | Wang | H04L 12/4641 726/12 |
| 2002/0010866 A1 * | 1/2002 | McCullough | H04L 63/0272 726/3 |
| 2003/0233576 A1 * | 12/2003 | Maufer et al. | 713/201 |
| 2006/0230182 A1 * | 10/2006 | Furukawa et al. | 709/245 |
| 2007/0115990 A1 * | 5/2007 | Asati | H04L 45/00 370/392 |
| 2007/0206597 A1 * | 9/2007 | Asati | H04L 12/4633 370/392 |
| 2008/0080509 A1 * | 4/2008 | Khanna | H04L 12/4641 370/392 |
| 2008/0307110 A1 * | 12/2008 | Wainner et al. | 709/238 |
| 2009/0097417 A1 * | 4/2009 | Asati | H04L 45/00 370/255 |
| 2009/0157901 A1 * | 6/2009 | Asati et al. | 709/238 |
| 2009/0172801 A1 * | 7/2009 | Friedrich | H04L 29/12066 726/12 |
| 2010/0085977 A1 * | 4/2010 | Khalid | H04L 12/4641 370/400 |
| 2011/0023090 A1 * | 1/2011 | Asati et al. | 726/4 |
| 2012/0250516 A1 | 10/2012 | Aggarwal et al. | |
| 2013/0058345 A1 * | 3/2013 | Kano | 370/392 |

OTHER PUBLICATIONS

Cisco, "Dynamic Multipoint VPN (DMVPN) Design Guide", Jul. 10, 2008, Cisco, Version 1.1, p. 26.*
Luciani et al., "NBMA Next Hop Resolution Protocol (NHRP)", Apr. 1998, The Internet Society, p. 1,16, and 43.*
Cisco, Migrating from Dynamic Multipoint VPN Phrase 2 to Phrase 3: Why and How to Migrate to the Next, Phase, 2006, Cisco, p. 1-16.*
S. Frankel et al., IP Security (IPsec) and Internet Key Exchange (IKE) Document Roadmap, Feb. 2011, Internet Engineering Task Force.

* cited by examiner

*Primary Examiner* — Joseph P Hirl
*Assistant Examiner* — Stephen Gundry
(74) *Attorney, Agent, or Firm* — Lempia Summerfield Katz LLC

(57) ABSTRACT

In one implementation, a hub and spoke network is made up of hub network devices and spoke network devices. A security protocol channel is established between the hub and at least a first spoke. The hub receives a resolution request from the first spoke via the security protocol channel. The resolution request includes data indicative of a second endpoint. The hub queries a next hop client database for a WAN address of the second endpoint. The first endpoint and the second endpoint are geographically separated nodes of the same enterprise network. The hub sends a resolution reply to the first endpoint including the WAN address for the second endpoint. The hub also sends a message to the second endpoint including a WAN address of the first endpoint and a summary of the data packet received at the first endpoint.

17 Claims, 8 Drawing Sheets

DYNAMIC COMMUNICATION BETWEEN SECURE ENDPOINTS

TECHNICAL FIELD

This disclosure relates in general to the field of communication between security protocol endpoints.

BACKGROUND

Internet protocol security (IPsec) is an example of a security protocol for securing network communications by authenticating and/or encrypting each data packet. Mutual authentication is established between a network of two or more computing system endpoints at the beginning of a communication session. However, in conventional IPsec and other similar security protocols, routers are statically configured for the secure communications. New endpoints cannot communicate without an administrative action to securely add the new endpoints to the network and it also requires updating the existing devices about the inclusion/deletion of new endpoints. These updates are time consuming and difficult to manage on large scale networks. In addition, adding new endpoints involves updating every other endpoint on the network with the security protocol settings for the new network. These updates are time consuming and difficult to manage on large scale networks. In scale scenarios, to create a full mesh network, policies are defined at each device which results in more CPU or memory utilization.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a method includes establishing a security protocol channel with a first endpoint and receiving a resolution request from the first endpoint via the security protocol channel. The resolution request includes data indicative of a second endpoint and the resolution request is in response to a data packet received at the first endpoint. The first endpoint and the second endpoint are geographically separated nodes of a same enterprise network. The method further includes querying a next hop client database for a secure address for the second endpoint, sending a resolution reply to the first endpoint including the secure address for the second endpoint, and sending a message to the second endpoint, wherein the message includes a secure address for the first endpoint and a summary of the data packet received at the first endpoint.

In another embodiment, an apparatus includes establishing a security protocol channel with a hub server, receiving a data packet, querying a policy database for a remote endpoint described in the data packet, generating, at a local endpoint, a resolution request in response to an absence of the remote endpoint in the policy database, sending the resolution request, including a summary of the data packet, to the hub server via the security protocol channel, wherein the resolution request includes a summary of the data packet, generating an entry for the remote endpoint in the policy database in response to a reply received from the hub server in response to the resolution request.

Example Embodiments

In an enterprise network, a hub is centrally located network device (e.g., router) and administers the spokes connected to the hub. A spoke may be a network device such as a branch router or an edge router. Spokes located in different geographies are connected to the same hub. Each spoke maintains a substantially constant connection with the hub as defined by a router configuration file. As the size of the hub and spoke networks increases, the size of the requisite configuration file also increases. The configuration file includes numerous lines of code per spoke. The lines of code specify how to establish a tunnel to communicate with each of the other spokes, which may be defined by crypto maps and access control lists. As the number of peers grows linearly, the size of the configuration file grows exponentially. For example, for n spokes, the complete configuration file includes n*(n−1) configurations with each configuration including multiple lines of instructions.

The following embodiments provide dynamic secure connections between the spokes through administration by the hub. The dynamic secure connections are created as needed, which reduces the size of the configuration file at each of the spokes. In addition, the following example embodiments create a dynamic mesh network without the requirement of prior configuration of the endpoints.

Figure 1:
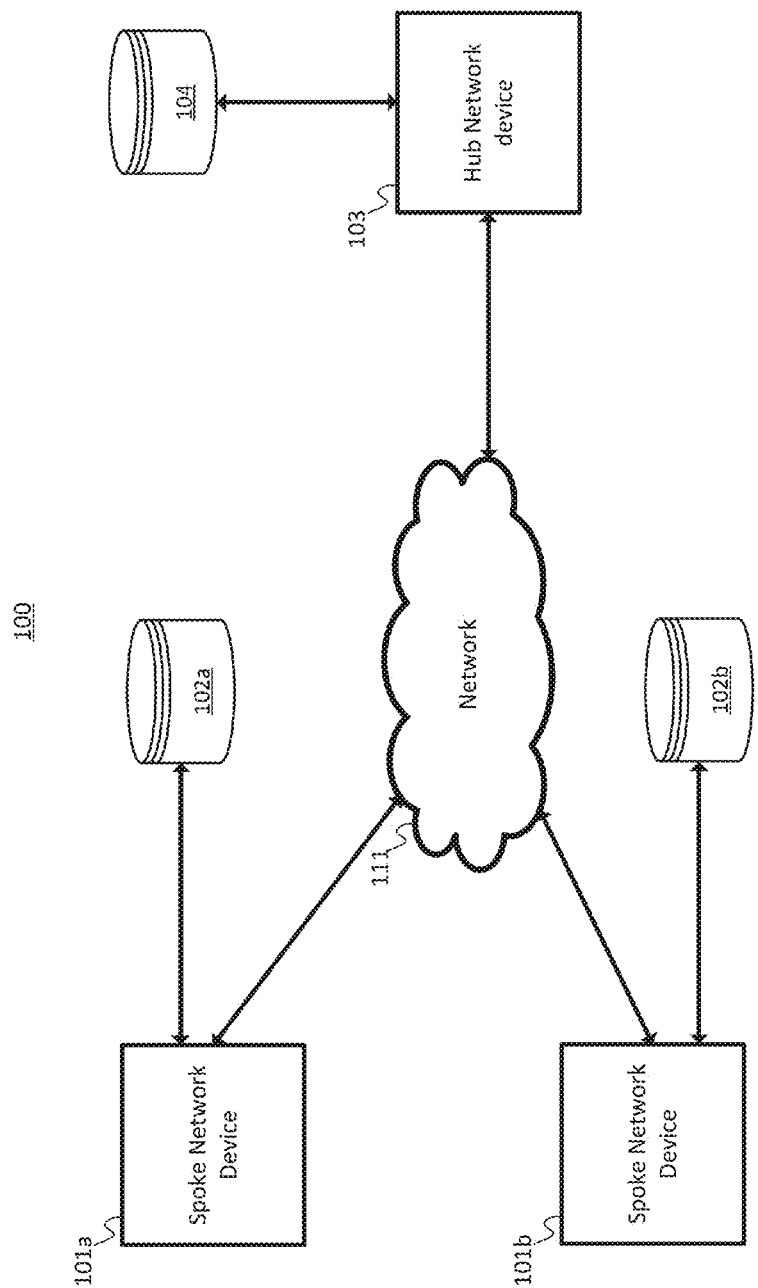
FIG. 1 illustrates an example network for dynamic communication between endpoints.

FIG. 1 illustrates an example hub and spoke network 100 for dynamic communication between endpoints. The hub and spoke network 100 includes multiple spokes, including spoke network device 101a and spoke network device 101b, and a hub network device 103. The spoke network device 101a and spoke network device 101b are coupled with a configuration database 102a and configuration database 102b, respectively. The hub network device 103 is coupled with a next hop client database 104 including mapping information of wide area network (WAN) addresses of registered spoke network devices to one or more respective protected networks. The hub network device 103 facilitates secure and direct communication between the spoke network device 101a and spoke network device 101b.

The spoke network devices in the hub and spoke network may communicate via a security protocol, such as IPsec, that operates on the Internet layer of the Internet protocol suite. The security protocol may specify four stages including tunnel initiation, Internet key exchange, data transfer, and tunnel termination. Security protocols confidentiality and data integrity, authentication, and non-repudiation.

Figure 2:
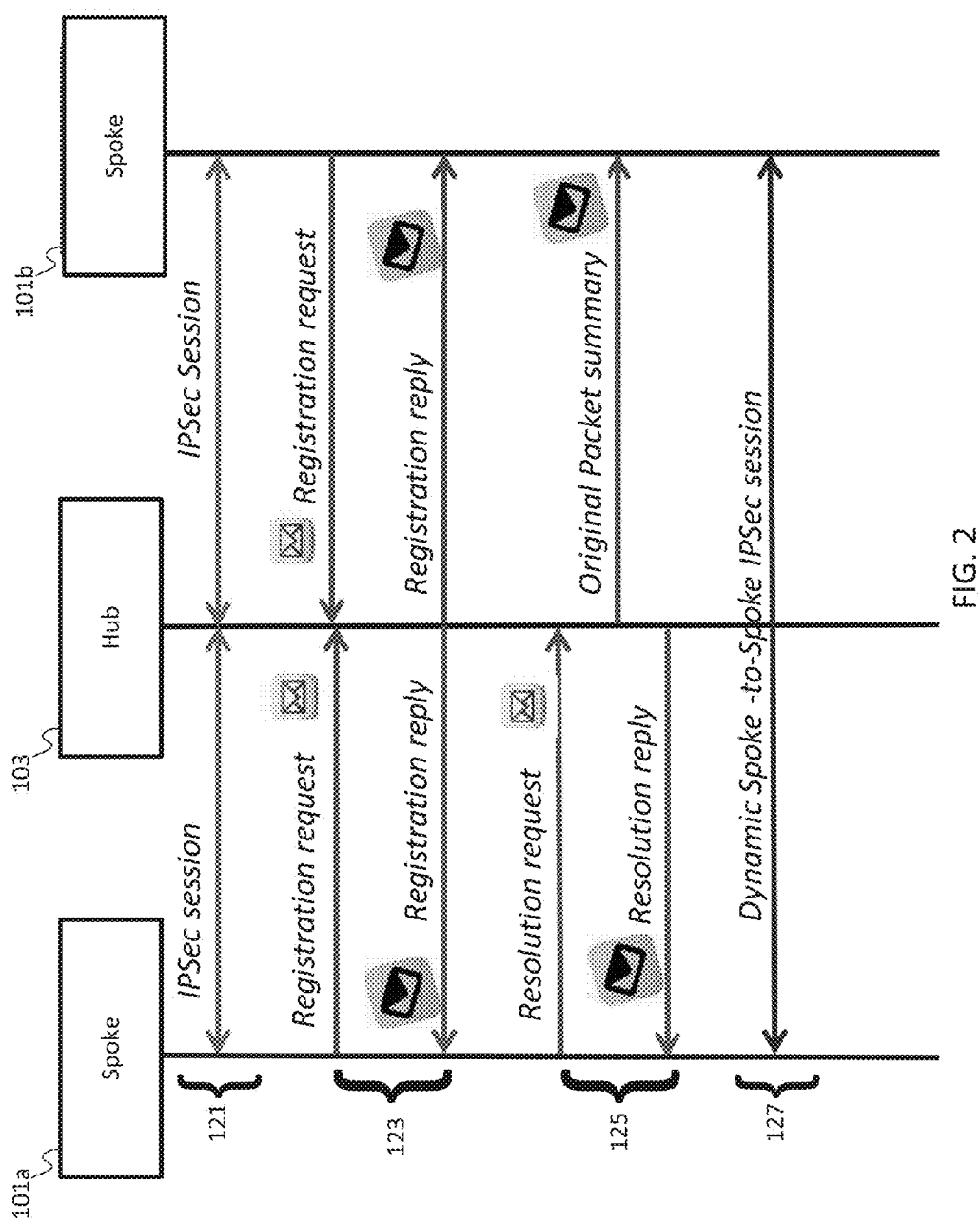
FIG. 2 illustrates an example events flow diagram for establishing dynamic communication between endpoints.

FIG. 2 illustrates an example event flow diagram for establishing dynamic communication between endpoints. As a preliminary phase 121, a security channel (e.g., IPSec session) is established between the spoke network device 101a and the hub network device 103, and another security channel (e.g., IPSec session) is established between the spoke network device 101b and the hub network device 103.

The secure direct connections are implemented using a registration phase 123 and a resolution phase 125. In each of the registration phase 123 and the resolution phase 125, the initiating spoke sends a request to the hub network device 103. The hub network device 103 responds with a reply. The requests and the replies for either or both of the registration phase 123 and the resolution phase 125 may be sent in the form of a user datagram protocol (UDP) packet. The UDP packet may include a header with four fields, including source port number, destination port number, length, and checksum.

Before a user of spoke network device 101a can initiate secure communication with spoke network device 101b, both spokes are registered with the hub. For example, the spoke network device 101a generates a registration request and sends the registration request to the hub network device 103. The registration request includes the WAN address of the spoke network device 101a and route summary of a protected local area network (LAN) of the spoke network device 101a. The route summary of the protected LAN includes a list of host addresses that belong to the same subnet of the protected LAN. The spoke network device 101b may have already been registered with the hub network device 103.

The hub network device 103 builds or updates a next hop client (NHC) database 104 based on the registration request received from the spoke network device 101a. The NHC database 104 includes mapping information of the WAN address of the spoke network device 101a to the protected network. The hub network device 103 also generates a registration reply in response to the registration request. The registration reply is an acknowledgment by the hub that the registration request was received. Similarly, a registration phase may be initiated by the spoke network device 101b.

After both spokes are registered with the hub, the resolution phase 125 may begin. The resolution phase 125 begins in response to a data packet being received at a registered spoke from any other host machine via the protected LAN of the spoke. In the resolution phase 125, a registered spoke (e.g., spoke network device 101a) queries the hub network device 101a for the WAN address of a remote spoke (e.g., spoke network device 101b). The spoke network device 101a may send a resolution request including a summary, which includes the source IP address and the destination IP address of the original packet.

The hub network device 103 is configured to process the resolution request and send the appropriate WAN address of the remote spoke to the initiator spoke device. Still in the resolution phase 125, the hub network device 103 forwards the WAN address of initiator spoke device and the summary of the original packet to the remote spoke device.

After the resolution phase 125 is complete, the spoke network devices 101a and 101b enter a direct communication phase 127. The direct communication phase 127 may be referred to as a dynamic spoke to spoke IPsec session.

Figure 3:
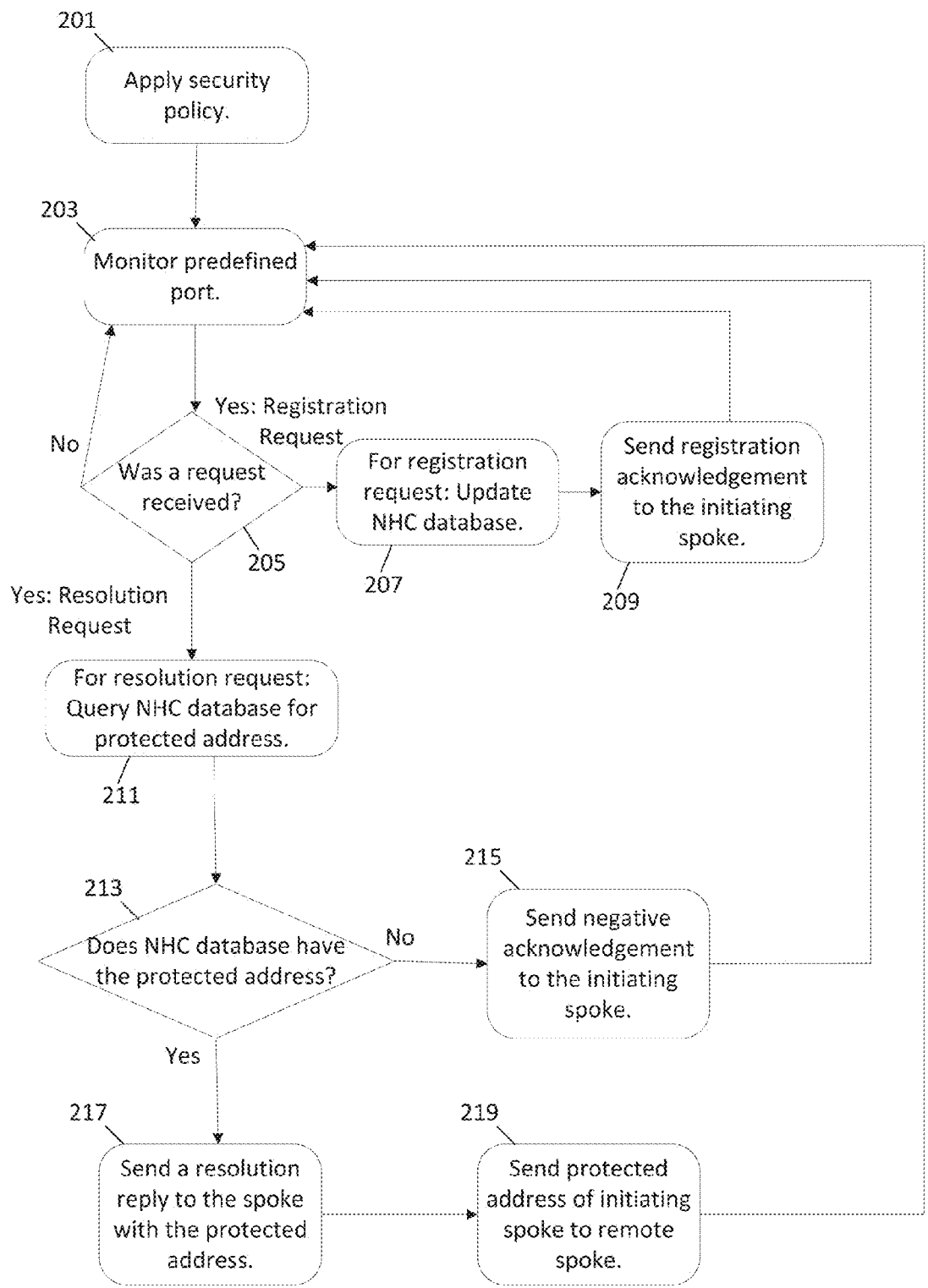
FIG. 3 illustrates an example flowchart for a hub network device of FIG. 1.

FIG. 3 illustrates an example flowchart for a more detailed process of the hub network device 103 of FIG. 1. At act 201, the hub network device 103 applies an IPSec policy. At act 203, the hub network device 103 monitors a predefined port. The predefined port is a UDP port.

The spoke network device configuration may include the global access list which defines the traffic selectors, global IPsec policy, which contains an IPSec transform-set and the next hop server's (hub's) WAN address and an authentication string.

An example IPSec policy stored at the hub network device 103 may be a dynamic map template. The dynamic map template includes an IPSec transform set, a group ID, and an authentication string. The IPSec transform set includes a bundle of parameters for implementing authentication headers (AH), which provide data origin authentication and protect against replay attacks, and for implementing encapsulating security payloads (ESP), which provide confidentiality and integrity. The IPSec transform set may also include one or more of an encryption algorithm, a hash algorithm, Diffie-Hellman algorithm for generating dynamic keys, and an operation value that specifies a mode of operation. Example modes of operation include tunnel and or transport.

The group ID may be configured uniquely for each IPSec transform set defined at the hub network device 103. Entries in the NHC database are organized by group ID. The group ID facilitates the hub device to query NHC database quickly. Also, the group ID provides secure inter-group communication between the spoke devices via the hub network device 103. For example, if two spoke devices use two different IPSec transform sets, then end to end secure communication will be enabled through the hub network device 103 according to group ID.

The authentication string may be configured and stored at the spoke device and at the hub network device 103. The authentication string provides mutual authentication between the spoke and the hub network device 103. Example formats for the mutual authentication string include any alphanumeric word or phrase (e.g., "helloworld").

While monitoring the predefined UDP port, the hub network device 103 determines whether any requests have been received on the predefined UDP port at act 205. A request is accepted at the hub network device 103 if the request is received on the predefined UDP port in which the hub network device 103 is listening for requests and a mutual authentication succeeds between the hub network device and the spoke. The mutual authentication is defined under the IPSec policy. If the mutual authentication does not succeed, the request is considered invalid. When an invalid request is received, or no request is received, the process loops back to act 203.

The hub network device 103 may distinguish between registration requests and resolution requests. The hub network device 103 identifies the request as either a registration request or a resolution request. The request may be identified based on an identifier field in the request packet. A registration request includes the WAN address of the initiating spoke and the summary of the protected LAN of the spoke. When a registration request is received from a spoke, at act 207, the hub network device 103 updates the NHC database by mapping the WAN address of the initiating spoke to the protected LAN of the initiating spoke.

In addition, for registration requests, the hub network device 103 generates a registration reply or acknowledgement, which is sent to the initiating spoke, at act 209. The registration reply or acknowledgement may include a confirmation of the mapping of the WAN address and the protected LAN address of the respective spoke device. After being registered with the hub network device 103, the initiating spoke may submit resolution requests.

After receiving a request from the initiating spoke at act 205, the hub network device 103 identifies the request as a resolution request. The resolution request includes a summary of a communication packet (the original data packet) previously received at the initiating spoke. The summary of the communication packet includes the source IP address and the destination IP address. The destination IP address corresponds to the protected LAN address of the desired remote spoke.

The hub network device 103 determines whether the desired spoke is registered at acts 211 and 213. For example, the hub network device 103 determines whether the NHC database includes a secure endpoint address that corresponds to the destination IP address. If the NHC database does not include the destination IP address (e.g., the desired spoke is not a registered spoke), the hub network device 103 generates and sends a negative acknowledgement to the initiating spoke at act 215. The process returns to act 203 to continue monitoring the predefined port (e.g., UDP port).

If the NHC database does include the destination IP address (e.g., the desired spoke is a registered spoke), the hub network device 103 generates and sends a resolution reply to the initiating spoke at act 217. The resolution reply may include the WAN address of the desired remote spoke. In addition, the hub network device 103 sends a packet, including the WAN address of the initiating spoke and the summary of the data packet, to the remote spoke at act 219. Once the remote spoke receives the summary of the original packet, the remote spoke determines whether the packet should be protected or not based on a global access list configured on the remote spoke. If the packet should be protected, then the remote spoke dynamically generates an IPSec policy. The IPSec policy may include the peer address as the WAN address of the initiating spoke and an access list based on the summary sent by hub network device 103. The process loops back to act 203 to continue monitoring the predefined port.

Figure 4:
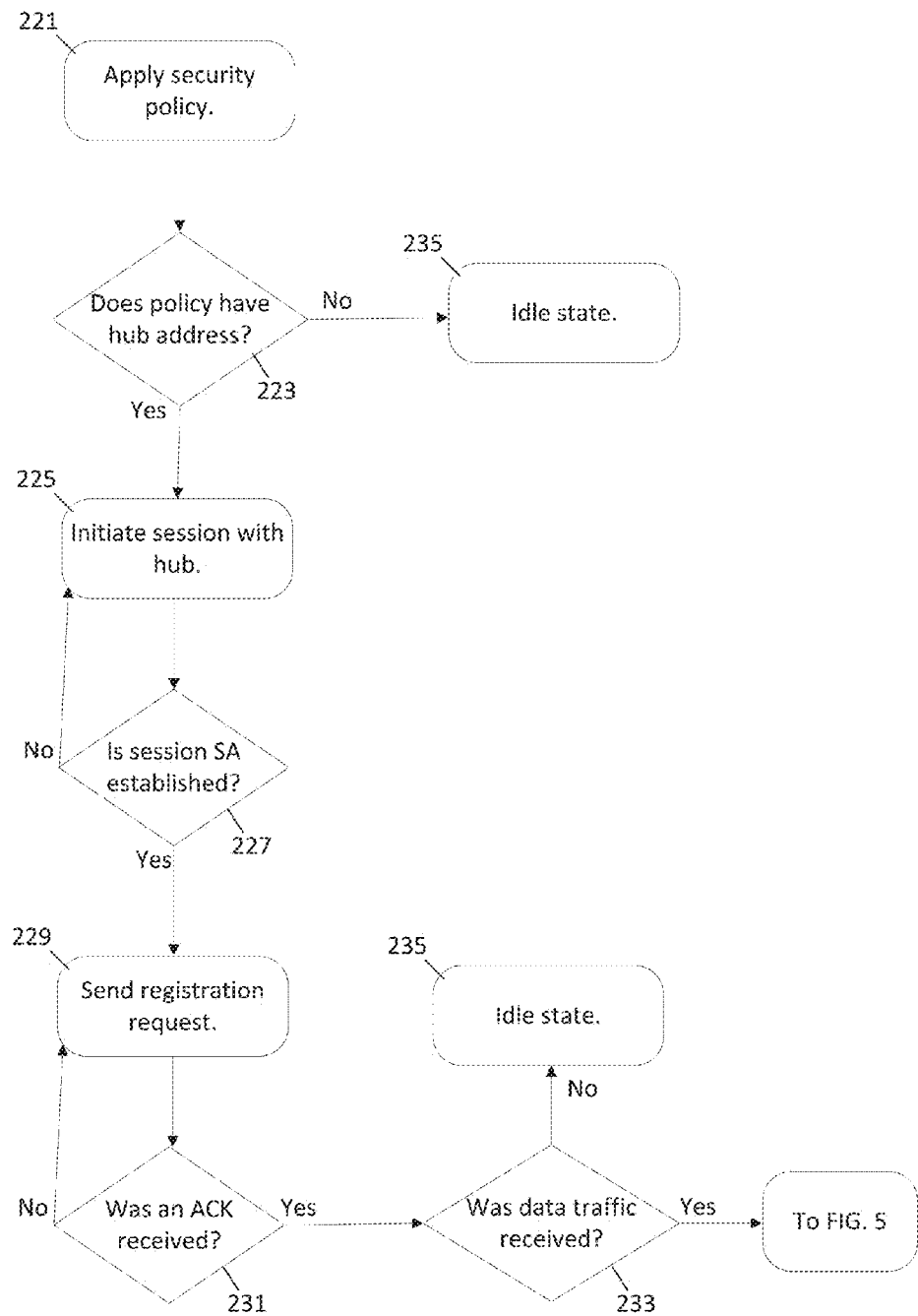
FIGS. 4 and 5 illustrate an example flowchart for a spoke network device of FIG. 1.
Figure 5:
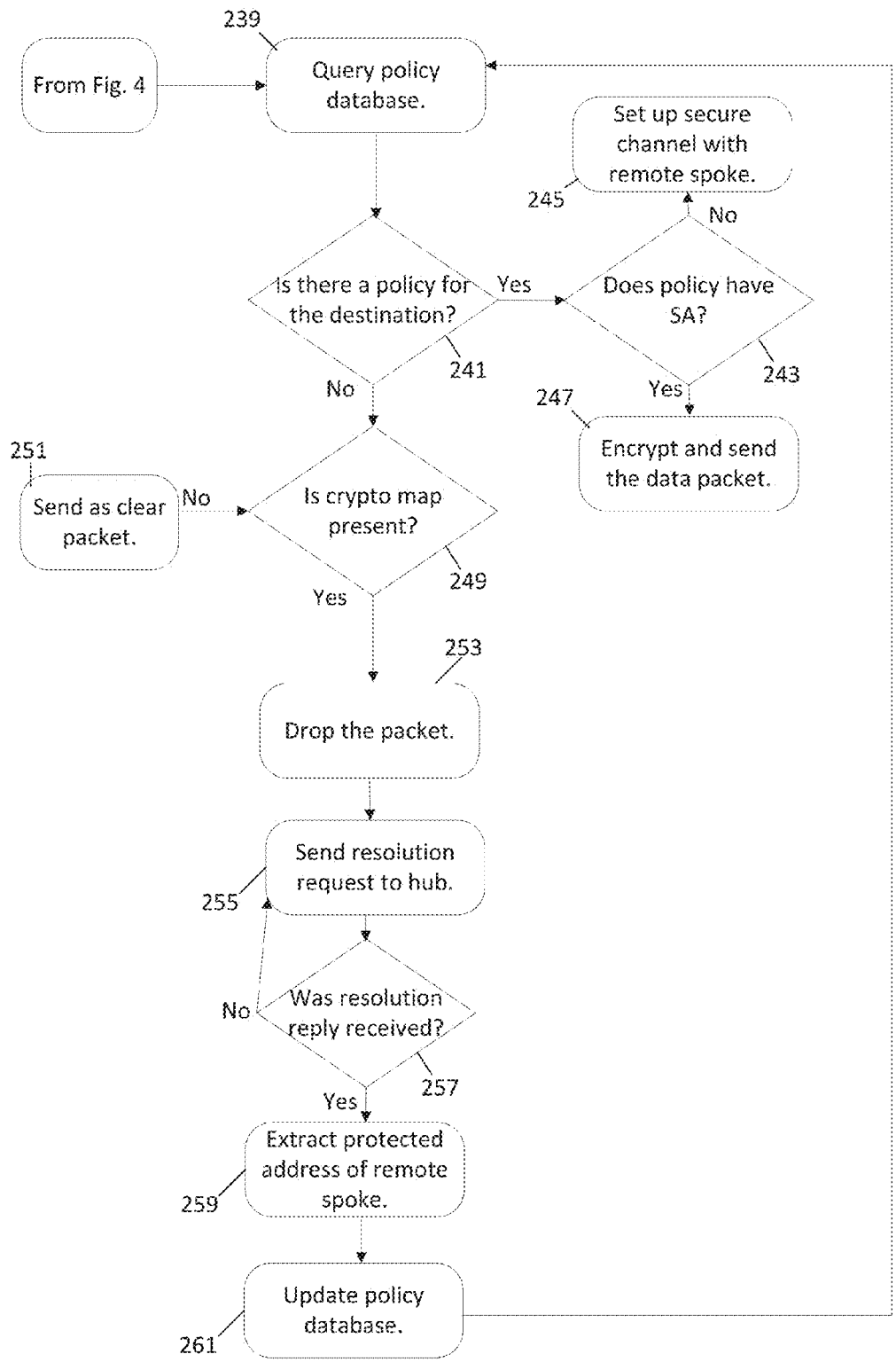

FIGS. 4 and 5 illustrate an example flowchart for a spoke network device 101a or 101b of FIG. 1. At act 221, the spoke network device applies the IPSec policy. The IPSec policy may configure and store the address of the hub network device 103 at the spoke network device and the address for one or more spokes at the hub network device 103. The IPSec policy may configure and store the address of the hub network device 103. At act 223, the spoke determines whether the security policy includes an address of the hub network device 103 as a next hop server address. If the hub network device 103 is not listed, the spoke enters an idle state at act 235, which may loop back to act 223.

The spoke device configuration includes a global access list that defines traffic selectors, a global IPsec policy which contains an IPSec transform set, an address of the hub network device 103 (next hop server), and the authentication string. Traffic selectors define the original source and destination IP address, source and destination ports and protocol information.

If the hub network device 103 is configured, at act 225, the spoke initiates a security session with the hub network device 103. The spoke determines whether a session security association (SA) is up at act 227. The security association is a relationship between the spoke and the hub network device 103 that describes how security services are used to communicate securely. IPSec provides network encryption and authentication. If the SA is not established, the process returns to act 225 until the SA is established.

When the SA has been established, the spoke network device generates a registration request and sends the registration request to the hub network device 103 at act 229. The registration request includes a summary of the protected network of the spoke. While the hub network device 103 processes the registration request, the spoke waits. The spoke determines whether an acknowledgement (ACK) has been received at act 231. When the ACK has been received, the spoke has become registered. The registered spoke waits for data traffic at act 233 through the idle state at act 235. When data traffic is received, the process moves to the acts illustrated in FIG. 5.

The spoke device receives a data packet including a destination address. When a data packet arrives at the spoke, the packet is analyzed to determine whether the packet should be protected or not. A global access list may identify packets as protected. If protection is required, then the spoke device drops the packet and generates the resolution request. The global access list may define, for example, that specific types of packets (e.g., file transfer protocol (FTP) packets) are protected and other types (e.g., HTTP packets) are not protected. At act 239, the spoke queries the policy database for the destination address of the received packet. If there is a policy for the destination address, the spoke determines whether the policy has a SA at act 243.

When the traffic pattern matches the IPsec policy defined in the spoke, the spoke network device checks whether any SAs exist between the spoke and its destination. If not, it will request the IKE and IPsec to establish the respective SAs and update the SA database. If the SA is already available, then the packets will be diverted via the existing SA. When the policy has an SA, the spoke encrypts and sends the data packet through a secure channel to the registered spoke corresponding to the destination address at act 247. When the policy does not have an SA, the spoke sets up a security channel with the registered spoke corresponding to the destination address at act 245. The registered spoke may be a spoke that is remote to the current spoke in geography and/or network association.

When there is no policy, at act 241, for the destination address from the received packet, the spoke proceeds to determine whether a global crypto access control list is present, at act 249. When no global crypto access control list is present, the received pack is sent as a clear packet at act 251. A clear packet is a packet without any IPsec protection applied (no encryption/authentication).

When the global crypto access control list is present, the spoke drops the received packet at act 253. The packet is dropped because the spoke network device has no information about the WAN address of the remote spoke. Hence, the spoke network device drops the original data packet and generates the resolution request to the hub for resolution of the respective remote spoke's WAN address. At act 255, the spoke generates a resolution request and sends the resolution request to the hub network device 103. The spoke waits for a resolution reply from the hub network device 103 at act 257. The waiting loop may include a timeout value such that the resolution request is sent again once the timeout value elapses.

When the resolution reply is received, the spoke extracts the WAN address of the remote spoke that corresponds to the protected LAN address at act 259. The spoke updates the policy database according to the protected LAN address at act 261. For example, in response to the resolution reply from the hub network device 103, the initiating spoke device may be configured to dynamically insert an IPSec policy into the policy database. The IPSec policy includes the WAN address of the remote spoke and an access list based on the summary sent by hub network device 103. Once the IPSec policies are dynamically added by both the spokes network devices, further outgoing data packets initiate direct communication via an IPsec session with the remote spoke network device. The spoke determines if any additional data traffic has been received at act 233, if no additional data traffic has been received, the spoke goes to an idle state 235. If additional data traffic has been received, the process returns to act 239.

If IPSec session between both SPOKEs gets deleted, then the IPSec policy added dynamically on both SPOKES will be deleted after some predefined time. If IPsec session is expired because of no traffic, then the respective policies are no longer required and can be deleted.

The registration phase and resolution phase for dynamic communication between endpoints provides several advantages over alternative protocols. For example, a dynamic multipoint virtual private network (DMVPN) relies on the tunneling protocol of generic routing encapsulation (GRE). GRE contributes to the overhead of the communication session by requiring another level of encapsulation which increases bandwidth utilization and router/CPU cycles, and increases the latency of the communication session.

Further, in the embodiments described above, endpoints can be added and removed from the hub and spoke network easily and automatically. There is no requirement that the configuration file of any spoke be changed when other endpoints are added.

The disclosed embodiments include minimal IPsec configuration in contrast to existing full mesh networks. For example, in a traditional network with 50 spokes, in which each spoke can communicate with the other 49 spokes, each spoke has a configuration file including a crypto map with 50 instances. Each instance has 4 lines of configuration (crypto map template, transform set, peer address, and match address) in addition to 50 lines of access control list. Therefore, the total size of configuration for each spoke is about 250 lines (4*50+50), and the total size of configuration for all spokes is 12,500 (250*50=12,500). Using the dynamic secure communication described herein, the amount of configuration needed is greatly reduced. The size of the configuration file for each spoke may be reduced to, for example, 56 lines (50 lines of Global ACL+6 lines of crypto map template) and the total size of the configuration files on all 50 spokes may be reduced to, for example, 2,800 lines (50*56).

Figure 6:
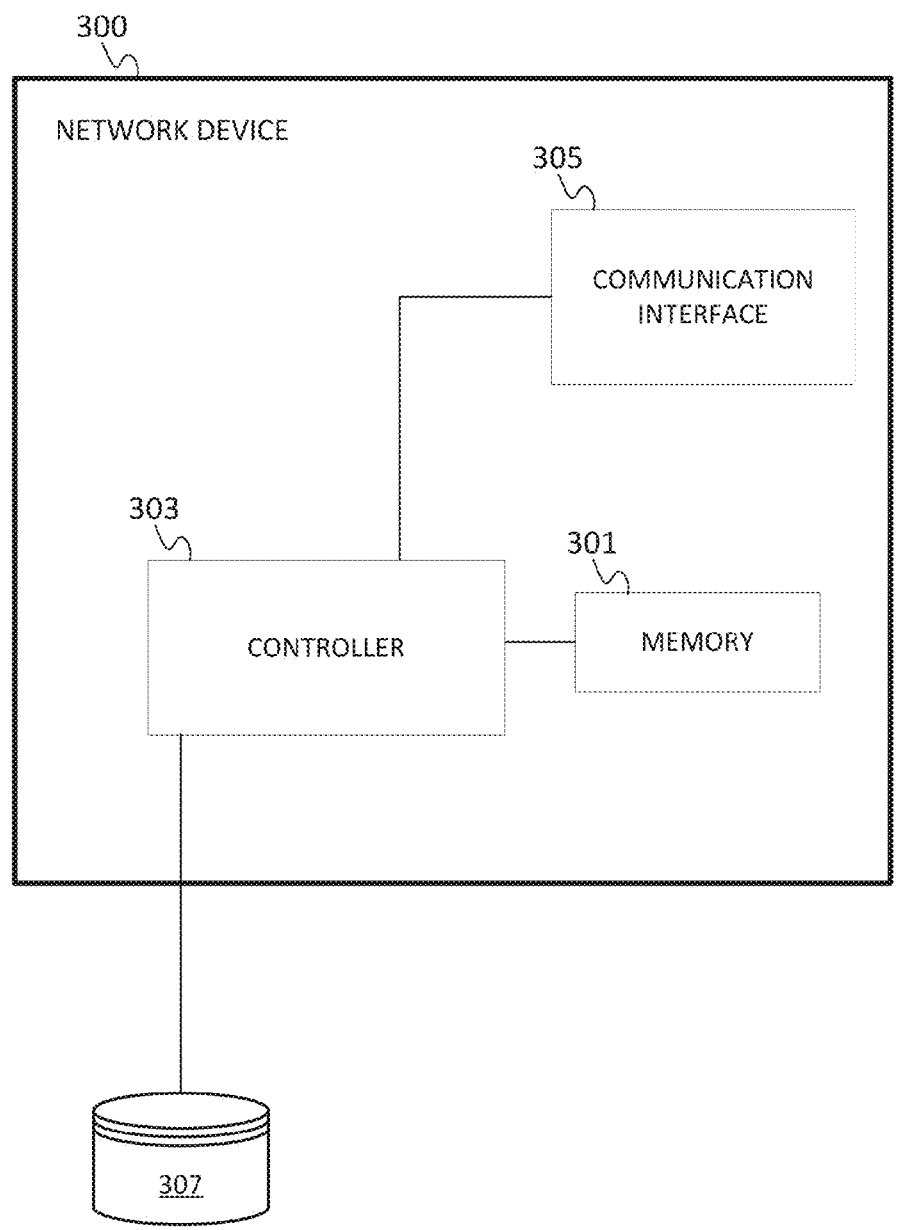
FIG. 6 illustrates an example network device for the hub network device or the spoke network device.
Figure 7:
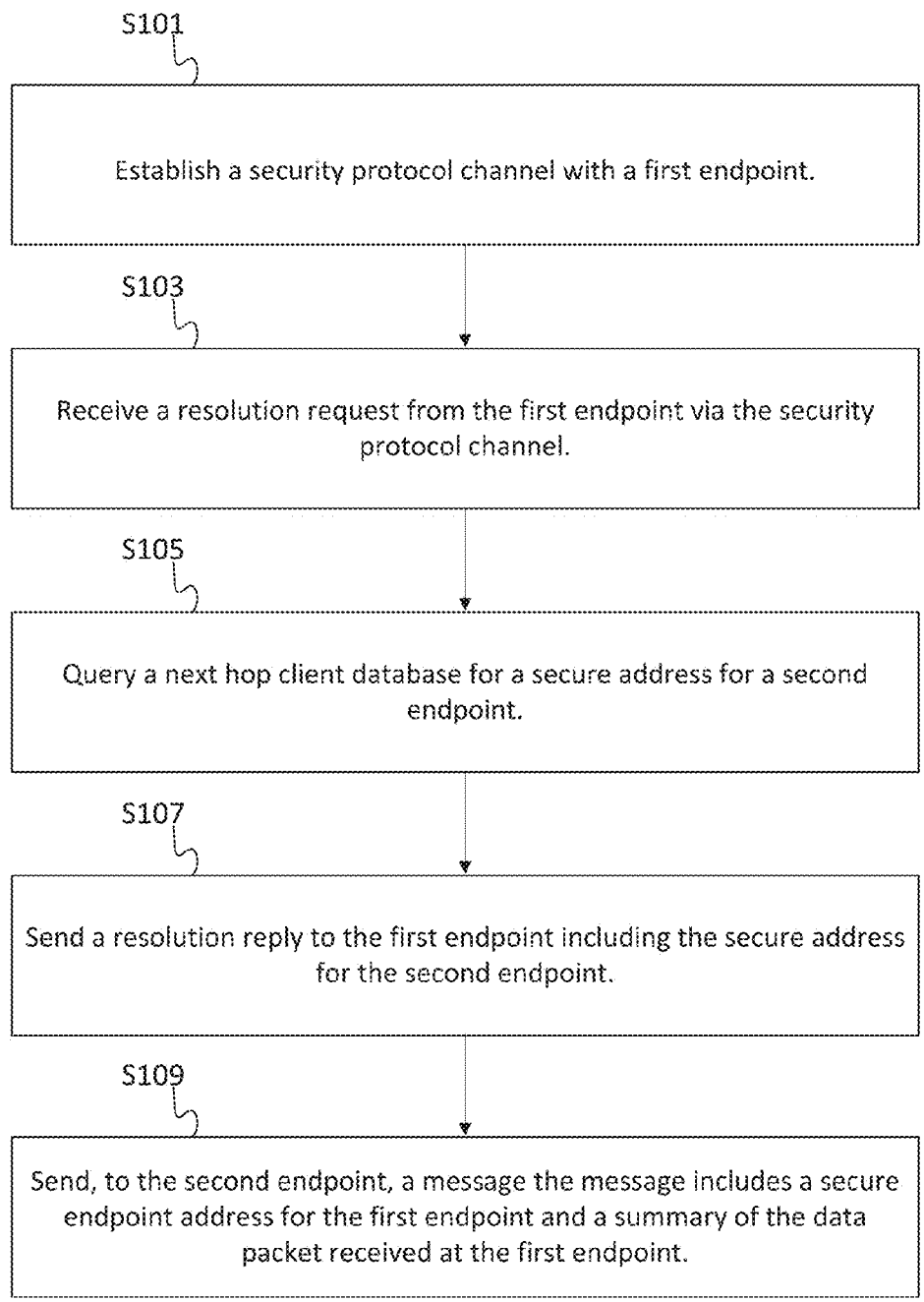
FIG. 7 illustrates another example flowchart for the hub network device of FIG. 1.

FIG. 6 illustrates an example network device 300 for the networks of FIG. 1 of FIG. 2. The network device 300 includes at least a memory 301, a controller 303, and a communication interface 305. In one example, a database 307 stores possible session ID values. Additional, different, or fewer components may be provided. Different network devices may have the same or different arrangement of components. The network device 300 may correspond to a hub device (e.g., hub network device 103) or a spoke device (e.g., spoke network device 101a or spoke network device 101b). FIG. 7 illustrates an example flowchart for the network device 300 as the hub network device 103 of FIG. 1. Additional, different, or fewer acts may be provided. The acts are performed in the order shown or other orders. The acts may also be repeated.

At act S101, the controller 303 and/or communication interface 305 establish a security protocol channel with a first endpoint. The security protocol channel may be set up according to IPSec, as defined by RFC 6071, IP Security (IPsec) and Internet Key Exchange (IKE) Document Roadmap, published February 2011 and available at RFC 6071 on the IETF website.

At act S103, the controller 303 receives a resolution request from the first endpoint via the security protocol channel. The resolution request includes data indicative of a second endpoint. The second endpoint is geographically spaced away from the first endpoint. The first and second endpoints may be at different locations of the same enterprise. The resolution request is generated by the first endpoint in response to a data packet received at the first endpoint destined to a remote endpoint. The resolution request includes a protected LAN address of the remote endpoint extracted from the data packet.

At act S105, the controller 303 queries a database 307 (e.g., next hop client database) for a WAN address of the second endpoint. The database 307 includes a lookup table listing the spokes in the hub and spoke network that have communicated with the hub network device 103. The lookup table includes mapping information that associates WAN address of spokes to corresponding protected LAN.

At act S107, the controller 303 sends a resolution reply to the first endpoint including the WAN address of the second endpoint.

At act S109, the controller 303 sends a message to the second endpoint. The message includes a WAN address of the first endpoint and a summary of the data packet received from the first endpoint. The controller 303 is also configured to register the first endpoint and second endpoint. For example, when the controller 303 receives a registration request from the first endpoint, the controller 303 updates the next hop client database to map the secure address of first end point to its protected LAN address.

Figure 8:
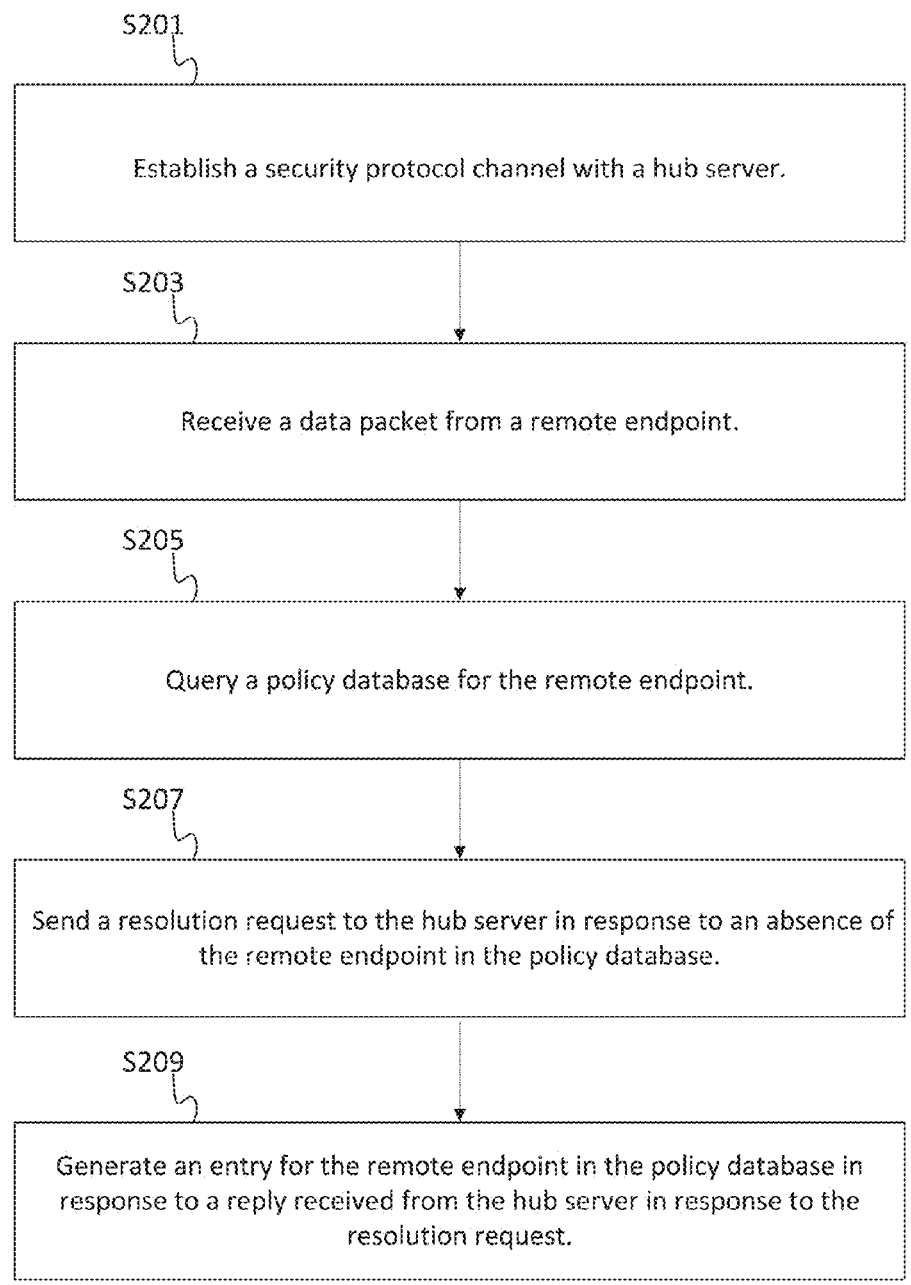
FIG. 8 illustrates another example flowchart for the spoke network device of FIG. 1.

FIG. 8 illustrates another example flowchart for the spoke network device 101a or 101b, which may be embodied by the network device 300 of FIG. 6. Additional, different, or fewer acts may be provided. The acts are performed in the order shown or other orders. The acts may also be repeated.

At act S201, the controller 303 establishes a security protocol channel with a hub server. At act S203, the controller 303 receives a data packet. The data packet includes an address of a remote endpoint that is geographically spaced from the network device 300. The data packet triggers the resolution phase. The information from the data packet may be recorded in memory 301 for retransmission of the resolution request. However, the data packet itself may be dropped.

At act S205, the controller 303 queries database 307 (e.g., a policy database) in order to determine whether the remote endpoint is already listed with a policy. If the remote endpoint is associated with a policy, direct secure communication may take place between the endpoints. However, if the remote endpoint is not associated with a policy or listed in the database 307, the hub network device 103 facilitates establishing secure communication with the remote endpoint.

At act S207, the controller 303 generates a resolution request in response to the absence of the remote endpoint in the policy database. The controller 303 sends the resolution request to the hub network device 103 via the secure channel. The resolution request includes a summary of the data packet.

At act S209, the controller 303 generates an entry for the remote endpoint in the policy database in response to a reply received from the hub network device 103 in response to the resolution request.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The preceding embodiments provide many benefits not achieved by conventional deployments of policy enforcement and/or HTTP based authentication infrastructure. For example, if the IP address of the endpoint changes because of restart or DHCP lease expiry, the router may not be aware of those events, which results on an unreliable identity cache on the routers. As another example, if the user on the endpoint logs off and another user logs in on the same device, the router may be unaware of the new user identity. The identity cache described above avoids these concerns.

The network 111 may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:
1. A method comprising:
  establishing a security protocol channel with a first endpoint;
  receiving a registration request from the first endpoint, wherein the registration request includes a route summary of a protected network including the first endpoint;

receiving a resolution request from the first endpoint via the security protocol channel, wherein the resolution request includes data indicative of a second endpoint and the resolution request is in response to a data packet received at the first endpoint;

querying a next hop client database for a secure address for the second endpoint, wherein the first endpoint and the second endpoint are geographically separated nodes of a same enterprise network;

sending a user datagram protocol (UDP) packet including a resolution reply to the first endpoint including the secure address for the second endpoint; and sending a message to the second endpoint, wherein the message includes a secure address for the first endpoint and a summary of the data packet received at the first endpoint, wherein the first endpoint is configured to drop the data packet without forwarding the data packet in response to the data packet being protected and generate the resolution request in response to the data packet being protected, wherein no generic routing encapsulation (GRE) is used for the resolution reply and for the resolution request.

2. The method of claim 1, further comprising:
updating, in response to the registration request, the next hop client database to map the secure address of the first endpoint from the registration request to the first endpoint.

3. The method of claim 1, wherein the resolution request is generated by the first endpoint in response to receiving the data packet from the second endpoint.

4. The method of claim 3, wherein the first endpoint analyzes the data packet to determine whether the data packet is protected according to a global access list.

5. The method of claim 1, further comprising:
sending a negative acknowledgement to the first endpoint if the next hop client database does not have an entry for the second endpoint.

6. The method of claim 1, further comprising:
monitoring a predetermined specialized port associated with registration requests and resolution requests.

7. An apparatus comprising:
a communication interface configured to receive a registration request from a first endpoint, wherein the registration request includes a route summary of a protected network including the first endpoint, and receive a resolution request from the first endpoint via a security protocol channel, wherein the resolution request includes data indicative of a second endpoint and the resolution request is in response to a data packet received at the first endpoint;

a controller configured to query a next hop client database for a secure address for the second endpoint, wherein the first endpoint and the second endpoint are geographically separated nodes of a same enterprise network and configured to generate a user datagram protocol (UDP) packet including a resolution reply to the first endpoint including the secure address for the second endpoint and generate a message to the second endpoint, wherein the message includes a secure address for the first endpoint and a summary of the data packet received at the first endpoint, wherein no generic routing encapsulation (GRE) is used for the resolution reply and for the resolution request.

8. The apparatus of claim 7, wherein the controller is configured to update, in response to the registration request from the first endpoint, the next hop client database to map the secure address of the first endpoint from the registration request to the first endpoint.

9. The apparatus of claim 7, wherein the controller is configured to generate a negative acknowledgement to the first endpoint if the next hop client database does not have an entry for the second endpoint.

10. A method comprising:
establishing a security protocol channel with a hub server;
generating a registration request for the local endpoint via the security protocol channel, wherein the registration request includes a route summary of a protected network including a local endpoint, wherein the route summary includes a list of host addresses for the protected network;

receiving a data packet;
querying a policy database for a remote endpoint described in the data packet;
generating, at the local endpoint, a resolution request in response to an absence of the remote endpoint in the policy database;
sending the resolution request to the hub server via the security protocol channel, wherein the resolution request includes a summary of the data packet; and
generating an entry for the remote endpoint in the policy database in response to a user datagram protocol (UDP) packet including a reply received from the hub server in response to the resolution request, wherein no generic routing encapsulation (GRE) is used for the reply and for the resolution request.

11. The method of claim 10, further comprising:
receiving an acknowledgement reply from the hub server, wherein the registration request is configured to update a next hop client database of the hub server to include the local endpoint.

12. The method of claim 11, further comprising:
updating an access list for the remote endpoint in response to the acknowledgment reply from the hub server.

13. The method of claim 11, further comprising:
querying an access list for the remote endpoint; and
determining whether the data packet should be protected based on the access list.

14. The method of claim 13, further comprising:
dropping the data packet in response to the data packet being protected.

15. The method of claim 10, further comprising:
establishing a communication session between the local endpoint and the remote endpoint based on the entry for the remote endpoint in the policy database.

16. The method of claim 10, wherein the summary of the data packet includes a public address for the remote endpoint and the reply received from the hub server includes a protected address for the remote endpoint.

17. A method comprising:
establishing a security protocol channel with a first endpoint;
receiving a registration request from the first endpoint, wherein the registration request includes a route summary of a protected network including the first endpoint;
receiving a resolution request from the first endpoint via the security protocol channel, wherein the resolution request includes data indicative of a second endpoint and the resolution request is in response to a data packet received at the first endpoint;

querying a next hop client database for a secure address for the second endpoint, wherein the first endpoint and the second endpoint are geographically separated nodes of a same enterprise network;

sending a user datagram protocol (UDP) packet including a resolution reply to the first endpoint including the secure address for the second endpoint; and sending a message to the second endpoint, wherein the message includes a secure address for the first endpoint and a summary of the data packet received at the first endpoint, wherein the resolution request is generated by the first endpoint in response to receiving the data packet from the second endpoint, wherein the first endpoint analyzes the data packet to determine whether the data packet is protected according to a global access list, wherein the resolution request is generated in response to the data packet being protected, and the first endpoint is configured to drop the data packet without forwarding the data packet in response to the data packet being protected, wherein no generic routing encapsulation (GRE) is used for the resolution reply and for the resolution request.

* * * * *